Patented Aug. 8, 1933

1,921,536

UNITED STATES PATENT OFFICE 1,921,536

PRODUCTION OF MOLYBDENUM AND TUNGSTEN CARBONYL

Max Naumann, Ludwigshafen - on - the - Rhine, Germany, assignor to I. G. Farbenindustrie Aktiengesellschaft, Frankfort-on-the-Main, Germany No Drawing. Application January 17, 1931, Serial No. 509,530, and in Germany January 20, 1930

8 Claims. (Cl. 23—203)

The present invention relates to improvements in the production of the carbonyls of molybdenum and tungsten.

It has not hitherto been possible to obtain substantial amounts of molybdenum carbonyl or tungsten carbonyl in an economical manner by the action of carbon monoxide under pressure at elevated temperatures on molybdenum or tungsten or materials containing the same.

I have now found that the bad yields are due to the fact that in the usual method of working the carbon monoxide is allowed to act on the molybdenum or tunsten metal at temperatures which are too low, namely below 200° C. Contrary to expectation, which would lead to the conclusion that by reason of the increasing dissociation of the carbonyl formed with increasing temperature and the increasing decomposition of the carbon monoxide the yields would be bad, I have found that by working at temperatures above 210° C. and preferably at temperatures of for example 225° C. and higher the yields are considerably higher. Thus for example from metallic molybdenum, which when treated with carbon monoxide under a pressure of 200 atmospheres yields practically no molybdenum carbonyl at 200° C. considerable amounts of carbonyl are obtained at from 225° to 300° C. The temperatures above 210° C. to be used according to the present invention depend especially on the nature of the initial material and the greater or less ease with which it is attacked by the carbon monoxide, and also on the pressure. When temperatures higher than 300° C. are to be used, the pressure must be substantially higher than 200 atmospheres. In order to avoid an undesirable decomposition of the carbon monoxide, local superheating should be avoided and it is also advantageous to mix with the carbon monoxide gas or with the solid initial materials substances which counteract the decomposition of the carbon monoxide, as for example sulphur compounds, such as hydrogen sulphide, sulphur dioxide, carbon oxysulphide, carbon disulphide or organic sulphur compounds such as mercaptanes or metal sulphates or sulphides, such as copper sulphate, iron sulphate, sodium sulphide; or elementary sulphur may be added to the solid initial material before or after reduction. Arsenic, phosphorus or their compounds may also be used for this purpose.

The separation of the molybdenum or tungsten carbonyl formed from the excess carbon monoxide, which is preferably returned to the process, may be effected for example by cooling in simple strippers, the narrow parts of the apparatus advantageously being kept at so high a temperature that the carbonyl remains vaporous or fused in these parts of the apparatus and cannot be deposited in a solid form, or by washing out for example with benzene or ether, the washing liquid preferably being led through the washer in countercurrent and under pressure. In this case the reaction product may be withdrawn continuously in a simple manner through a simple valve in the form of its solutions. If the material serving for the formation of carbonyl contains other carbonyl-forming metals as well as molybdenum or tungsten or both, the resulting solid molybdenum or tungsten carbonyl can be separated together with the other liquid carbonyls and withdrawn from the apparatus in solution therein. The purification of the molybdenum or tungsten carbonyl obtained may be effected, when necessary, by sublimation, preferably in a current of carbon monoxide and while excluding oxidizing agents, or by crystallization, as for example from benzene, care being taken that light is excluded, especially when iron carbonyl is present, since otherwise decomposition products and solid iron nona-carbonyl also separate.

The process according to the present invention is suitable for the recovery of pure molybdenum and tungsten from their ores or other materials containing molybdenum and/or tungsten. By the thermal decomposition of the molybdenum or tungsten carbonyl, the molybdenum or tungsten can be obtained in the form of compact metal, powder or sponge according to the conditions employed. Care should be taken that by suitable selection of the temperature and the like oxidation and carbonization of the metals are prevented as far as desired. The carbon and oxygen which may be present in the metals thus obtained, may be removed wholly or partially by mixing metal containing more oxygen than desired with metal containing more carbon than desired in suitable proportions and thermally treating the mixture, thereby removing carbon and oxygen in the form of volatile compounds. The metallic powders may be consolidated to compact material by sintering, alloys being obtained when other metals are present, or they may be used for example for preparing alloys by the fusion method.

The yields in molybdenum and tungsten carbonyl can be further increased by carrying out the reduction of the initial material to metallic molybdenum or tungsten in the presence of copper or its compounds, as specifically described and claimed in the co-pending application for patent by Max Naumann and Leo Schlecht, Ser. No. 509,529, filed January 17, 1931.

The following examples will further illustrate the nature of this invention but the invention is not restricted to these examples.

Example 1

Pure metallic molybdenum obtained by reducing molybdic acid at 800° C. by means of hydrogen is treated with carbon monoxide at between 225° and 300° C. under a pressure of 200 atmospheres. A considerable amount of molybdenum carbonyl is obtained, whereas at 200° C. no carbonyl is formed.

Example 2

Molybdic acid together with so much copper nitrate that the reduced material contains 10 per cent of copper is reduced by means of hydrogen at 800° C. The mass is then treated with carbon monoxide under a pressure of 200 atmospheres at a temperature of from 275° to 300° C. 15 per cent of the molybdenum employed is converted into molybdenum carbonyl in the course of 8 hours. If the carbon monoxide be allowed to act under the same conditions at 200° C., only a small proportion of the molybdenum employed is converted.

Example 3

Tungstic acid containing about 20 per cent of copper is reduced at about 800° C. by means of hydrogen and then acted upon with carbon monoxide at 240° C. under a pressure of 200 atmospheres. The yield in tungsten carbonyl is about 20 times higher than that obtained under otherwise equal conditions at 200° C.

What I claim is:—

1. In the production of metal carbonyl by the action of carbon monoxide on a material containing at least one of the metals molybdenum and tungsten, the step of operating at a temperature of at least 210° C.

2. In the production of metal carbonyl by the action of carbon monoxide on a material containing at least one of the metals molybdenum and tungsten, the step of operating at a temperature of at least 225° C.

3. In the production of metal carbonyl by the action of carbon monoxide on a material containing at least one of the metals molybdenum and tungsten, the step of operating at a temperature between 225° and 300° C. under a pressure of about 200 atmospheres.

4. In the production of metal carbonyl by the action of carbon monoxide on a material containing at least one of the metals molybdenum and tungsten, the step of reducing the initial material in the presence of copper and effecting the treatment with carbon monoxide at a temperature of at least 225° C.

5. In the production of metal carbonyl by the action of carbon monoxide on a material containing at least one of the metals molybdenum and tungsten, the step of operating at a temperature of at least 210° C. in the presence of a substance which counteracts the decomposition of carbon monoxide selected from the class consisting of the metalloids arsenic, sulphur, phosphorus and their compounds.

6. In the production of metal carbonyl by the action of carbon monoxide on a material containing at least one of the metals molybdenum and tungsten, the step of operating at a temperature between 225 and 300° C. under a pressure of about 200 atmospheres in the presence of a substance which counteracts the decomposition of carbon monoxide selected from the class consisting of the metalloids of arsenic, phosphorus, sulphur and their compounds.

7. The process of producing molybdenum carbonyl which comprises reducing molybdic acid with hydrogen and reacting the resulting material with carbon monoxide under a pressure of 200 atmospheres and at a temperature ranging from 225 to 300° C.

8. The process as defined in claim 7 wherein the reduction is effected at 800° C. in the presence of copper nitrate.

MAX NAUMANN.